US012659821B2

(12) United States Patent (10) Patent No.: US 12,659,821 B2

Hwang et al. (45) Date of Patent: Jun. 16, 2026

(54) METHOD AND DEVICE WHICH MINIMIZE INTERRUPT DURING HANDOVER IN INTEGRATED ACCESS BACKHAUL SYSTEM AND WHICH ARE FOR FIRST CONNECTION IN MULTIPLE MOBILE TERMINALS

(71) Applicant: SAMSUNG ELECTRONICS CO., LTD., Suwon-si (KR)

(72) Inventors: June Hwang, Suwon-si (KR); Weiwei Wang, Suwon-si (KR); Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/553,174

(22) PCT Filed: Apr. 1, 2022

(86) PCT No.: PCT/KR2022/004695

§ 371 (c)(1),
(2) Date: Sep. 28, 2023

(87) PCT Pub. No.: WO2022/211570

PCT Pub. Date: Oct. 6, 2022

(65) Prior Publication Data

US 2024/0187951 A1 Jun. 6, 2024

(30) Foreign Application Priority Data

Apr. 1, 2021 (KR) ........................ 10-2021-0042753

(51) Int. Cl.
H04W 36/00 (2009.01)
H04W 36/08 (2009.01)
(Continued)

(52) U.S. Cl.
CPC .... H04W 36/0077 (2013.01); H04W 36/0011 (2013.01); H04W 36/08 (2013.01); H04W 74/0833 (2013.01); H04W 84/047 (2013.01)

(58) Field of Classification Search
None
See application file for complete search history.

(56) References Cited

U.S. PATENT DOCUMENTS 10,075,863 B2 * 9/2018 Delsol ............... H04W 36/0094
10,136,359 B2 11/2018 Hampel et al.
2021/0014339 A1 1/2021 Zhang et al.

FOREIGN PATENT DOCUMENTS

KR 20200035850 A 4/2020

OTHER PUBLICATIONS

International Search Report and Written Opinion of the International Searching Authority dated Jul. 6, 2022, in connection with International Application No. PCT/KR2022/004695, 10 pages.

(Continued)

*Primary Examiner* — Willie J Daniel, Jr.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

12 Claims, 14 Drawing Sheets

(51) Int. Cl.
    *H04W 74/0833*     (2024.01)
    *H04W 84/04*      (2009.01)

(56)              References Cited

OTHER PUBLICATIONS

Qualcomm Incorporated, "(TP for BL CR to 38.401) Inter-donor Topology Adaptation Procedures", R3-210347, 3GPP TSG-RAN WG3 Meeting #111-e, E-meeting, Jan. 25-Feb. 5, 2021, 16 pages.
Ericsson, "Summary of [AT113-e][030][eIAB] Reply LS DAPS-like solution (Ericsson)", R2-2102288, 3GPP TSG-RAN WG2 #113e, Electronic meeting, Jan. 25-Feb. 5, 2021, 13 pages.
Qualcomm Incorporated, "CB#34IAB_MigrationProcedureDetails", R3-211199, 3GPP TSG-RAN WG3 #111-e, Online, Jan. 25-Feb. 4, 2021, 57 pages.
Supplementary European Search Report dated Jul. 26, 2024, in connection with European Patent Application No. 22781689.9, 13 pages.
Huawei et al: "BL CR to 38.401 Support for IAB", RP-201077, 3GPP TSG RAN WG3 Meeting #108-e, Online, Jun. 2020, 25 pages.
Samsung: "(TP for NR-IAB BL CR for 38.401) Stage 2 clean-up for IAB", R3-202836, 3GPP TSG-RAN WG3 #107bis-e, Apr. 2020, Online, 14 pages.
Zte et al: "Further considerations on inter-donor IAB Node Migration procedure", R3-210207, 3GPP TSG-RAN WG3 #111-e, Jan. 25-Feb. 4, 2021, 19 pages.
Office Action dated Mar. 3, 2026, in connection with Korean Application No. 10-2021-0042753, 11 pages.
Huawei et al., " BL CR to 38.401 Support for IAB," R3-204462, 3GPP TSG RAN WG3 #108-e, Jun. 2020, 25 pages.

* cited by examiner

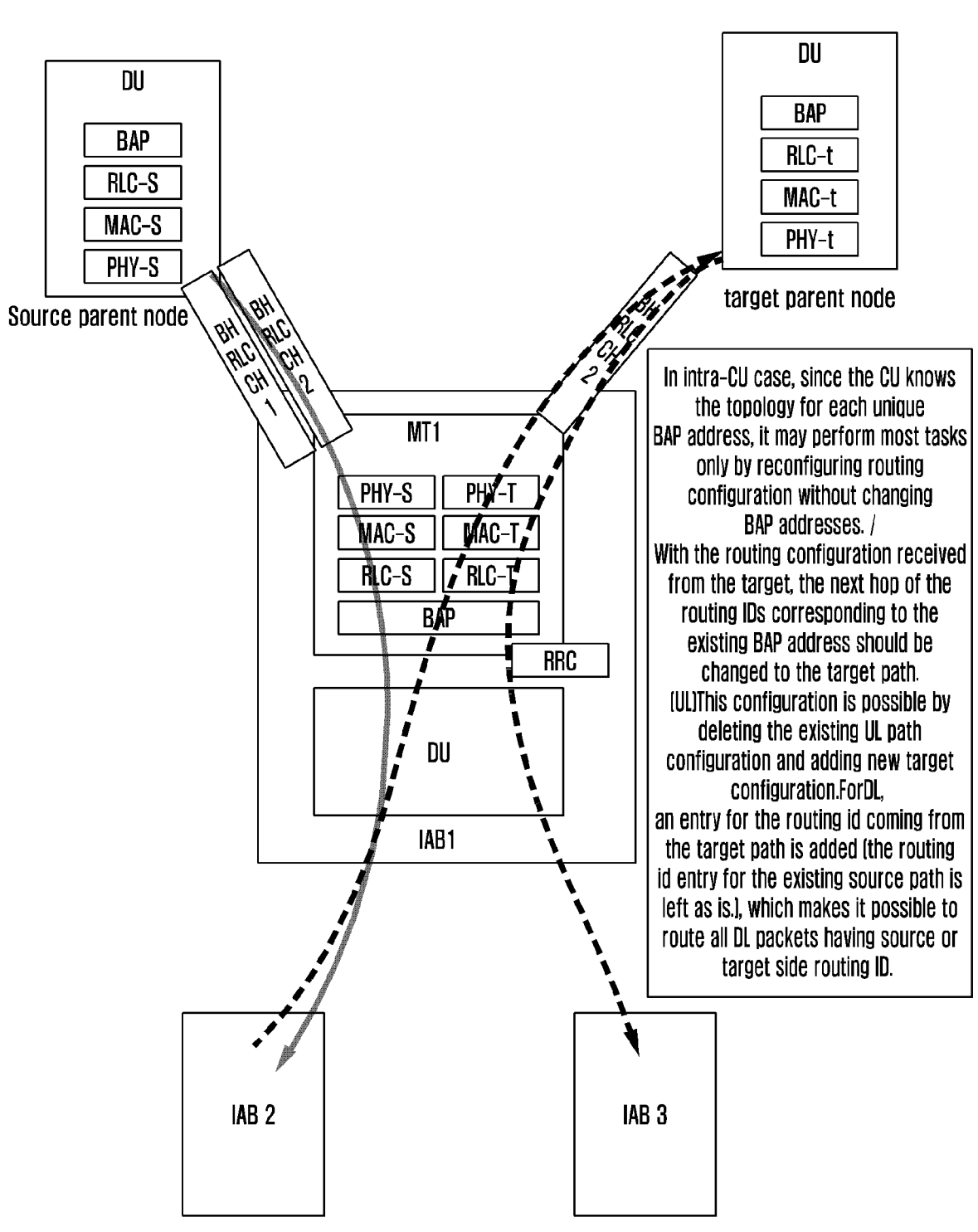

In intra-CU case, since the CU knows the topology for each unique BAP address, it may perform most tasks only by reconfiguring routing configuration without changing BAP addresses. /
With the routing configuration received from the target, the next hop of the routing IDs corresponding to the existing BAP address should be changed to the target path.
[UL]This configuration is possible by deleting the existing UL path configuration and adding new target configuration.ForDL,
an entry for the routing id coming from the target path is added [the routing id entry for the existing source path is left as is.], which makes it possible to route all DL packets having source or target side routing ID.

FIG. 7E

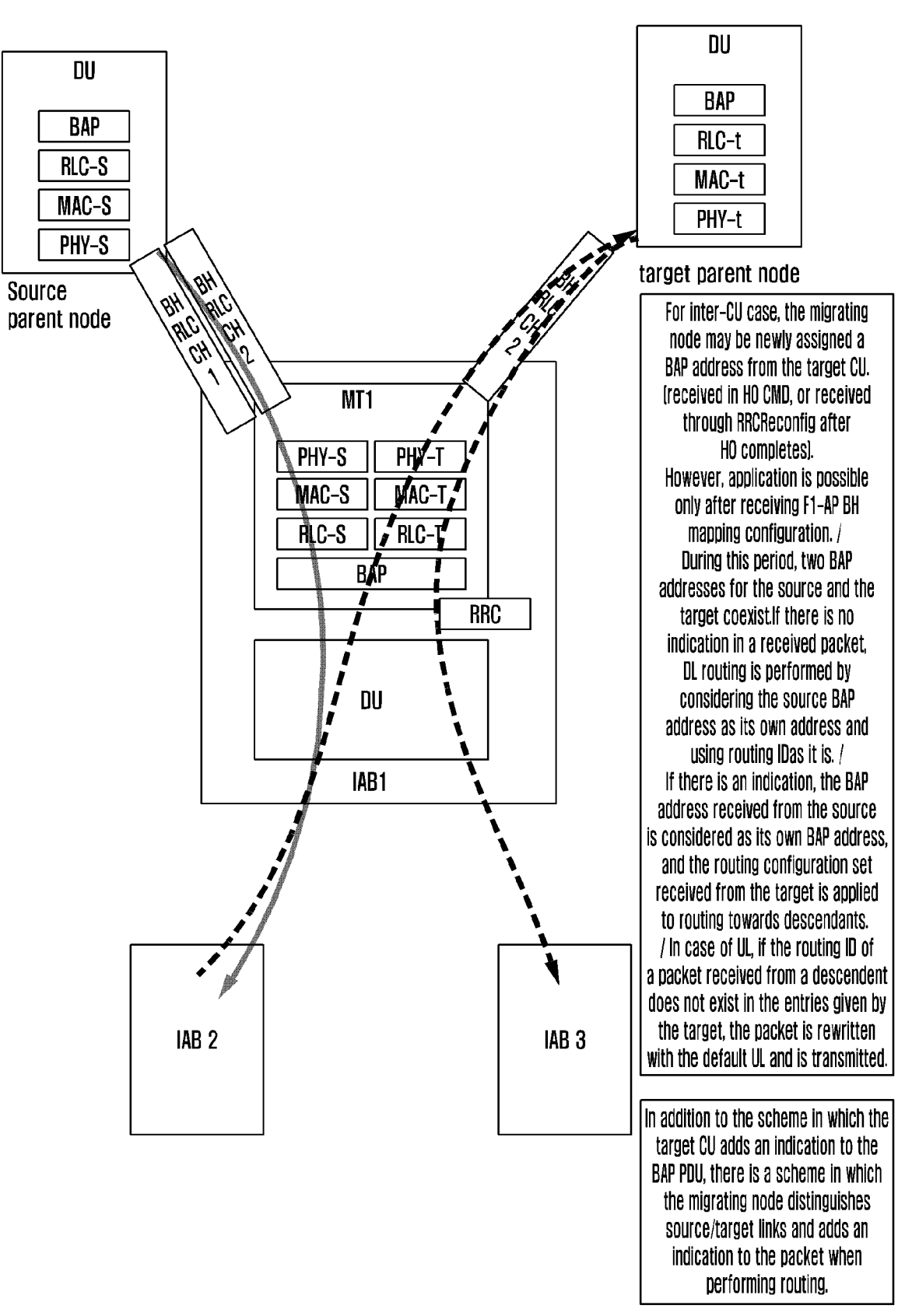

Source parent node

DU
- BAP
- RLC-S
- MAC-S
- PHY-S target parent node

DU
- BAP
- RLC-t
- MAC-t
- PHY-t

MT1
- PHY-S / PHY-T
- MAC-S / MAC-T
- RLC-S / RLC-T
- BAP

RRC

DU

IAB1

IAB 2

IAB 3

For inter-CU case, the migrating node may be newly assigned a BAP address from the target CU. (received in HO CMD, or received through RRCReconfig after HO completes). However, application is possible only after receiving F1-AP BH mapping configuration. / During this period, two BAP addresses for the source and the target coexist.If there is no indication in a received packet, DL routing is performed by considering the source BAP address as its own address and using routing IDas it is. / If there is an indication, the BAP address received from the source is considered as its own BAP address, and the routing configuration set received from the target is applied to routing towards descendants. / In case of UL, if the routing ID of a packet received from a descendent does not exist in the entries given by the target, the packet is rewritten with the default UL and is transmitted.

In addition to the scheme in which the target CU adds an indication to the BAP PDU, there is a scheme in which the migrating node distinguishes source/target links and adds an indication to the packet when performing routing.

METHOD AND DEVICE WHICH MINIMIZE INTERRUPT DURING HANDOVER IN INTEGRATED ACCESS BACKHAUL SYSTEM AND WHICH ARE FOR FIRST CONNECTION IN MULTIPLE MOBILE TERMINALS

TECHNICAL FIELD

The disclosure relates to a wireless communication system and, more particularly, to a mobility handling method for an integrated access and backhaul system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, coop-erative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT tech-nology and the Big Data processing technology through connection with a cloud server, has emerged. As technology elements, such as "sensing technology", "wired/wireless communication and network infrastructure", "service inter-face technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data gen-erated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamform-ing, MIMO, and array antennas. Application of a cloud Radio Access Network (RAN) as the above-described Big Data processing technology may also be considered to be as an example of convergence between the 5G technology and the IoT technology.

As described above, as various services can be provided according to the development of wireless communication systems, a method for effectively providing these services is required.

DISCLOSURE OF INVENTION

Technical Problem

The disclosure relates to an operation for eliminating interruption when an integrated access and backhaul (IAB) node performs migration between donor DUs and a method for establishing multiple links when multiple MTs form one IAB node. The disclosed embodiments are intended to provide an apparatus and method capable of effectively providing services in a mobile communication system.

Solution to Problem

During IAB node migration, network connection may be lost while detaching from the source parent node and connecting to the target parent node. To prevent this, the IAB node may maintain the connection with the source parent node without disconnecting it while executing the HO command, and at the same time, it can perform DL reception with the target parent node. In particular, when random access is performed, the IAB node performs UL switching upon success, and at this time, routing for DL/UL BAP PDUs must be performed without problems. To this end, a conditional UL routing configuration is introduced.

In addition, when multiple MTs form one IAB node, the network cannot know whether they are members of the same IAB node. In order to distinguish this, IAB node related indication information is notified to the network.

To solve the above problems in the disclosure, a method performed at an integrated access and backhaul (IAB) node in a wireless communication system may include: receiving a control message for handover from a source IAB node; generating a medium access control (MAC) entity for a target IAB node based on the received control message; establishing a logical channel and a radio link control (RLC) entity for the target IAB node; reconfiguring a backhaul adaptation protocol (BAP) entity for the target IAB node wherein the BAP entity is associated with the RLC entity configured for the target IAB node; and performing a random access procedure to the target IAB node.

In some examples, the control message may include default uplink configuration information.

In some examples, the default uplink configuration infor-mation may be used for uplink transmission through the target IAB node.

In some examples, the source IAB node may transmit a message including an indication of triggered handover type to the target IAB node.

In some examples, in case that the random access proce-dure fails, the method may further include: falling back to the configuration for the source IAB node; and resuming the connection with the source IAB node.

In some examples, the handover may be configured for each backhaul RLC channel.

In some examples, the configuration for the BAP entity may include at least one of BAP address, BAP routing configuration, or bearer mapping configuration.

In some examples, in case that the random access procedure succeeds, the MAC entity delivers an indicator indicating success of random access to the BAP entity.

In other examples of the disclosure, an integrated access and backhaul (IAB) node may include: a transceiver capable of transmitting and receiving at least one signal; and a controller coupled to the transceiver, wherein the controller may be configured to: receive a control message for handover from a source IAB node; generate a medium access control (MAC) entity for a target IAB node based on the received control message; establish a logical channel and a radio link control (RLC) entity for the target IAB node; reconfigure a backhaul adaptation protocol (BAP) entity for the target IAB node, the BAP entity being associated with the RLC entity configured for the target IAB node; and perform a random access procedure to the target IAB node.

Advantageous Effects of Invention

According to a disclosed embodiment, during migration of an IAB node, the time during which the IAB node is not connected to the network can be eliminated. In addition, multiple IAB MTs associated with one IAB node can be distinguished.

BRIEF DESCRIPTION OF DRAWINGS

FIG. 5 is a block diagram illustrating an internal structure of a user equipment according to an embodiment of the disclosure.

FIG. 6 is a block diagram illustrating the configuration of a base station according to an embodiment of the disclosure.

FIG. 7D is a diagram illustrating operations of an IAB node according to an embodiment of the disclosure.

FIG. 7E is a diagram illustrating operations of an IAB node according to an embodiment of the disclosure.

MODE FOR THE INVENTION

Figure 1:
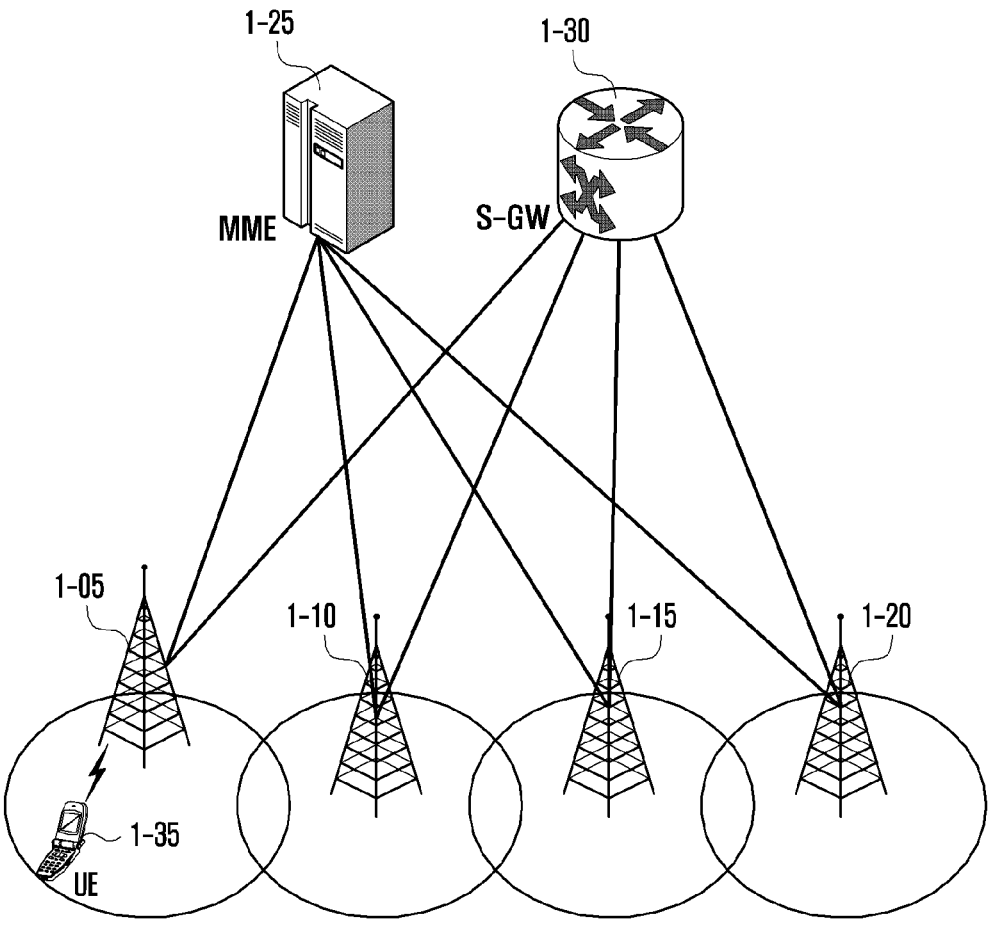
FIG. 1 is a diagram illustrating the architecture of an LTE system according to an embodiment of the disclosure.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more CPUs in a device or a secure multimedia card. Also, in the embodiment, a unit or the like may include one or more processors.

In the following description of the disclosure, detailed descriptions of well-known functions and structures incorporated herein may be omitted to avoid obscuring the subject matter of the disclosure. Hereinafter, embodiments of the disclosure will be described with reference to the accompanying drawings.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in the standards for 3GPP LTE (3rd Generation Partnership Project Long Term Evolution). However, the disclosure is not limited by the above terms and names, and can be equally applied to systems conforming to other standards. In the disclosure, "eNB" may be used interchangeably with "gNB" for convenience of description. That is, a base station described as an eNB may indicate a gNB. Also, the term "terminal" may refer to a mobile phone, a NB-IoT device, a sensor, or another wireless communication device.

In the following description, the base station (BS), as a main agent that allocates resources to a terminal, may be at least one of Node B, eNode B, gNode B, radio access unit, base station controller, or node on a network. The terminal may include, but not limited to, a user equipment (UE), a mobile station (MS), a cellular phone, a smartphone, a computer, or a multimedia system capable of performing a communication function.

In particular, the disclosure can be applied to 3GPP NR (5th generation mobile communication standards). Also, the disclosure may be applied to, based on 5G communication technology and IoT related technology, intelligent services (e.g., smart home, smart building, smart city, smart or connected car, health care, digital education, retail, security, and safety related services). In the disclosure, "eNB" may be used interchangeably with "gNB" for convenience of description. That is, a base station described as an eNB may indicate a gNB. Also, the term "terminal" may refer to a mobile phone, a NB-IoT device, a sensor, or another wireless communication device.

Wireless communication systems are evolving from early systems that provided voice-oriented services only to broadband wireless communication systems that provide high-speed and high-quality packet data services, such as systems based on communication standards including 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e.

As a representative example of the broadband wireless communication system, the LTE system employs orthogonal frequency division multiplexing (OFDM) in the downlink (DL) and single carrier frequency division multiple access (SC-FDMA) in the uplink (UL). The uplink refers to a radio link through which a terminal (user equipment (UE) or mobile station (MS)) sends data or a control signal to a base station (BS or eNode B), and the downlink refers to a radio link through which a base station sends data or a control signal to a terminal. In such a multiple access scheme, time-frequency resources used to carry user data or control information are allocated so as not to overlap each other (i.e., maintain orthogonality) to thereby identify the data or control information of a specific user.

As a post-LTE communication system, namely, the 5G communication system must be able to freely reflect various requirements of users and service providers and need to support services satisfying various requirements. Services considered for the 5G communication system include enhanced mobile broadband (eMBB), massive machine type communication (mMTC), and ultra-reliable and low-latency communication (URLLC).

According to some embodiments, eMBB aims to provide a data transmission rate that is more improved in comparison to the data transmission rate supported by existing LTE, LTE-A, or LTE-Pro. For example, in the 5G communication system, eMBB must be able to provide a peak data rate of 20 Gbps in the downlink and a peak data rate of 10 Gbps in the uplink from the viewpoint of one base station. At the same time, the 5G communication system has to provide an increased user perceived data rate for the terminal. To meet such requirements in the 5G communication system, it may be required to improve the transmission and reception technology including more advanced multi-antenna or multi-input multi-output (MIMO) technology. In addition, it is possible to satisfy the data transmission rate required by the 5G communication system by using a frequency bandwidth wider than 20 MHz in a frequency band of 3 to 6 GHz or 6 GHz or higher instead of a transmission bandwidth of up to 20 MHz in a band of 2 GHz currently used by LTE.

At the same time, in the 5G communication system, mMTC is considered to support application services such as the Internet of Things (IoT). For efficient support of IoT services, mMTC is required to support access of a massive number of terminals in a cell, extend the coverage for the terminal, lengthen the battery time, and reduce the cost of the terminal. The Internet of Things must be able to support a massive number of terminals (e.g., 1,000,000 terminals/km$^2$) in a cell to provide a communication service to sensors and components attached to various devices. In addition, since a terminal supporting mMTC is highly likely to be located in a shadow area not covered by a cell, such as the basement of a building, due to the nature of the service, it may require wider coverage compared to other services provided by the 5G communication system. A terminal supporting mMTC should be configured as a low-cost terminal, and since it is difficult to frequently replace the battery of a terminal, a very long battery life time such as 10 to 15 years may be required.

Finally, URLLC, as cellular-based mission-critical wireless communication for a specific purpose, is a service usable for remote control of robots or machinery, industrial automation, unmanned aerial vehicles, remote health care, and emergency alert. Hence, URLLC should provide ultra-reliable and low-latency communication. For example, a URLLC service may have to support both an air interface latency of less than 0.5 ms and a packet error rate of $10^{-5}$ or less as a requirement. Hence, for a service supporting URLLC, the 5G system must provide a transmission time interval (TTI) shorter than that of other services, and at the same time, a design requirement for allocating a wide resource in a frequency band may be required.

The above three services considered in the 5G communication system (i.e., eMBB, URLLC, and mMTC) can be multiplexed and transmitted in one system. Here, to satisfy different requirements of the services, different transmission and reception techniques and parameters can be used. However, mMTC, URLLC, and eMBB described above are only an example of different service types, and the service types to which the disclosure is applied are not limited to the above-described examples.

Further, embodiments of the disclosure will be described by using LTE, LTE-A, LTE Pro or 5G (NR) systems as an example, but the embodiments of the disclosure may be applied to other communication systems having similar technical backgrounds or channel configurations. Also, it should be understood by those skilled in the art that the embodiments of the disclosure can be applied to other communication systems without significant modifications departing from the scope of the disclosure.

Next, an operating principle of the disclosure will be described in detail with reference to the accompanying drawings. In the description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

FIG. 1 is a diagram illustrating the architecture of an existing LTE system.

With reference to FIG. 1, as illustrated, the radio access network of the LTE system may be composed of a next-generation base station (evolved node B, ENB, Node B or base station) 1-05, 1-10, 1-15 or 1-20, a mobility management entity (MME) 1-25, and a serving-gateway (S-GW) 1-30. A user equipment (UE or terminal) 1-35 may connect to an external network through the ENB 1-05, 1-10, 1-15 or 1-20 and the S-GW 1-30.

In FIG. 1, the ENBs 1-05, 1-10, 1-15 and 1-20 correspond to existing Node Bs of the universal mobile telecommunication system (UMTS). The ENB is connected to the UE 1-35 through a radio channel, but performs more complex functions in comparison to the existing Node B. In the LTE system, all user traffic including real-time services like VOIP (Voice over IP) may be served through shared channels. Hence, an apparatus is needed to perform scheduling on the basis of collected status information regarding buffers, available transmit powers and channels of the UEs, and the ENBs 1-05, 1-10, 1-15 and 1-20 can be responsible for this. One ENB may control multiple cells in a typical situation. To achieve a data rate of, for example, 100 Mbps in a bandwidth of, for example, 20 MHz, the LTE system may utilize orthogonal frequency division multiplexing (OFDM) as radio access technology. Also, the LTE system may apply adaptive modulation and coding (AMC) to determine the modulation scheme and channel coding rate according to channel states of the UE. The S-GW 1-30 is an entity providing data bearers, and may create and remove data bearers under the control of the MME 1-25. The MME is an entity in charge of various control functions including a mobility management function for the UE, and may be connected to a plurality of ENBs.

Figure 2:
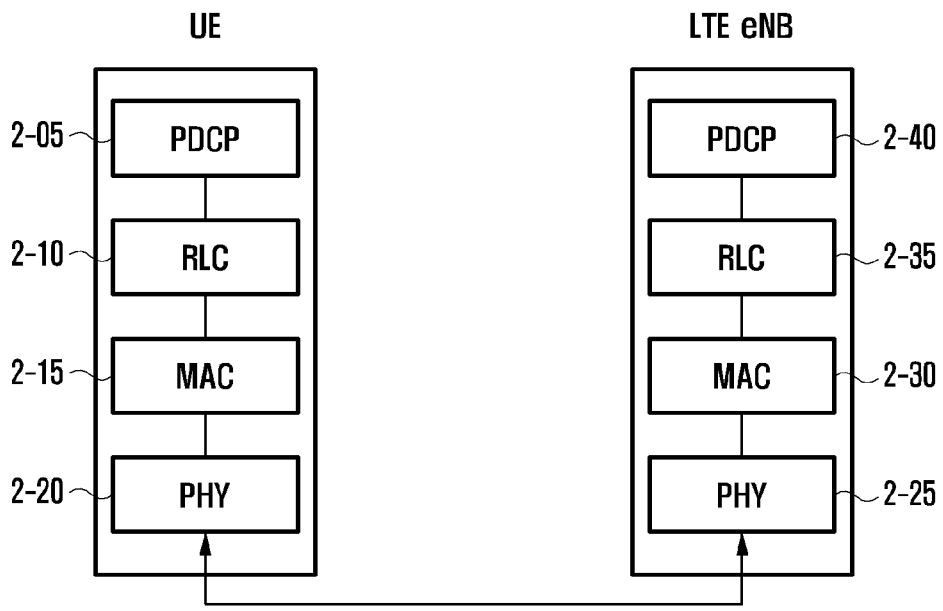
FIG. 2 is a diagram illustrating a structure of radio protocols in an LTE system according to an embodiment of the disclosure.

FIG. 2 is a diagram illustrating the structure of radio protocols in the LTE system according to an embodiment of the disclosure.

With reference to FIG. 2, in a UE or an ENB, the radio protocols of the LTE system may be composed of packet data convergence protocol (PDCP) 2-05 or 2-40, radio link control (RLC) 2-10 or 2-35, and medium access control (MAC) 2-15 or 2-30. The PDCP may perform compression and decompression of IP headers. The main functions of the PDCP may be summarized as follows.

Header compression and decompression function (header compression and decompression: robust header compression (ROHC) only)

User data transfer function (transfer of user data)

In-sequence delivery function (in-sequence delivery of upper layer protocol data units (PDUs) at PDCP re-establishment procedure for RLC acknowledged mode (AM))

Reordering function (for split bearers in dual connectivity (DC) (only support for RLC AM): PDCP PDU routing for transmission and PDCP PDU reordering for reception)

Duplicate detection function (duplicate detection of lower layer SDUs at PDCP re-establishment procedure for RLC AM)

Retransmission function (retransmission of PDCP SDUs at handover and, for split bearers in DC, of PDCP PDUs at PDCP data-recovery procedure, for RLC AM)

Cipher and decipher function (ciphering and deciphering)

Timer-based SDU discard function (timer-based SDU discard in uplink)

The radio link control (RLC) 2-10 or 2-35 may reconfigure PDCP PDUs (packet data unit) to a suitable size and perform automatic repeat request (ARQ) operation. The main functions of the RLC may be summarized as follows.

Data transfer function (transfer of upper layer PDUs)

ARQ function (error correction through ARQ (only for AM data transfer))

Concatenation, segmentation and reassembly function (concatenation, segmentation and reassembly of RLC SDUs (only for UM and AM data transfer))

Re-segmentation function (re-segmentation of RLC data PDUs (only for AM data transfer))

Reordering function (reordering of RLC data PDUs (only for UM and AM data transfer))

Duplicate detection function (duplicate detection (only for UM and AM data transfer))

Error detection function (protocol error detection (only for AM data transfer))

RLC service data unit (SDU) discard function (RLC SDU discard (only for unacknowledged mode (UM) and AM data transfer))

RLC re-establishment function (RLC re-establishment)

The MAC 2-15 or 2-30 may be connected with multiple RLC entities in a UE, and it may multiplex RLC PDUs into MAC PDUs and demultiplex MAC PDUs into RLC PDUs. The main functions of the MAC may be summarized as follows.

Mapping function (mapping between logical channels and transport channels)

Multiplexing and demultiplexing function (multiplexing/demultiplexing of MAC SDUs belonging to one or different logical channels into/from transport blocks (TB) delivered to/from the physical layer on transport channels)

Scheduling information reporting function (scheduling information reporting)

Hybrid automatic repeat request (HARQ) function (error correction through HARQ)

Priority handling function between logical channels (priority handling between logical channels of one UE)

Priority handling function between UEs (priority handling between UEs by means of dynamic scheduling)

Multimedia broadcast and multicast service (MBMS) service identification function (MBMS service identification)

Transport format selection function (transport format selection)

Padding function (padding)

The physical (PHY) layer 2-20 or 2-25 may convert higher layer data into OFDM symbols by means of channel coding and modulation and transmits the OFDM symbols through a radio channel, or it may demodulate OFDM symbols received through a radio channel, perform channel decoding, and forward the result to a higher layer.

Figure 3:
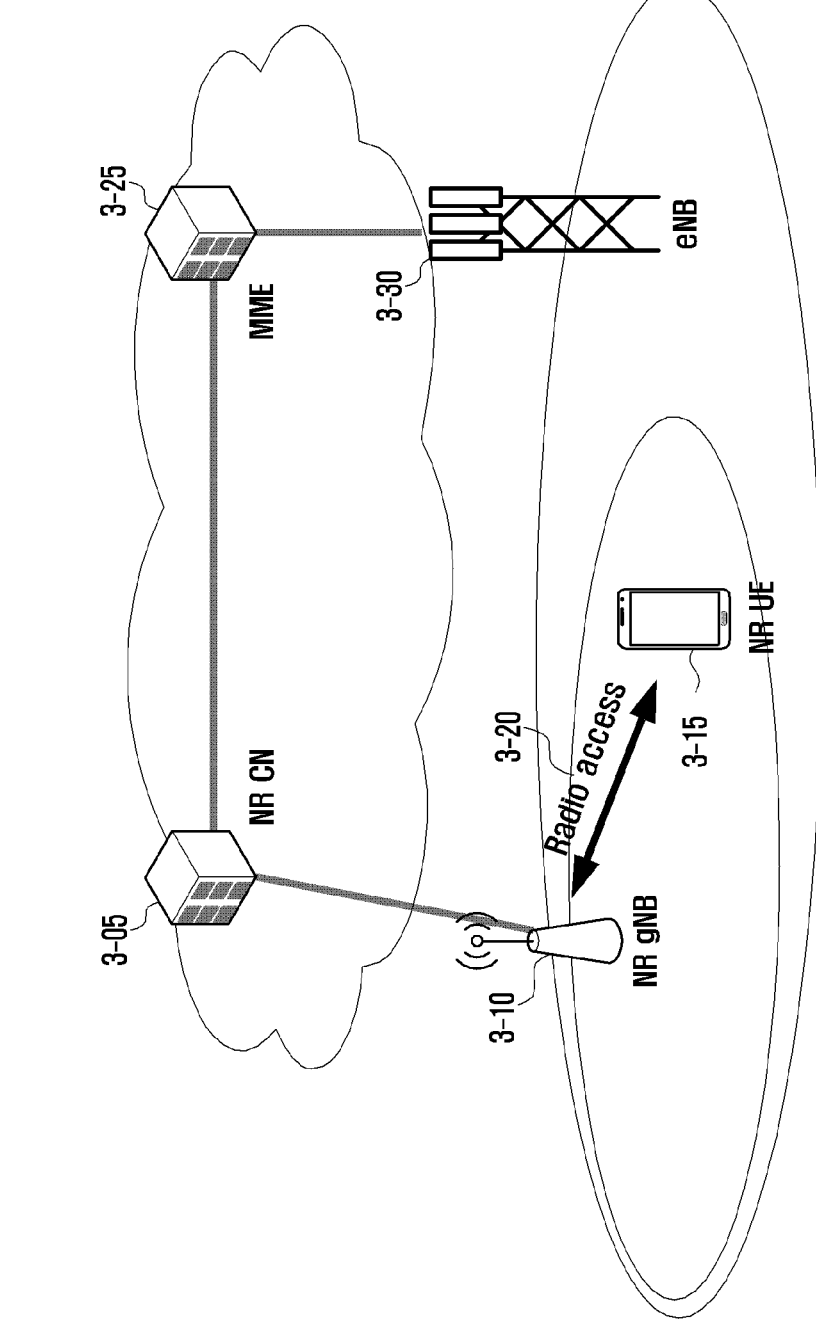
FIG. 3 is a diagram illustrating the architecture of a next-generation mobile communication system according to an embodiment of the disclosure.

FIG. 3 is a diagram showing the architecture of a next-generation mobile communication system according to an embodiment of the disclosure.

With reference to FIG. 3, the radio access network of a next-generation mobile communication system (hereinafter, NR or 5G) may be composed of a new radio node B (hereinafter, NR gNB or NR base station) 3-10 and a new radio core network (NR CN) 3-05. A new radio user equipment (hereinafter, NR UE or terminal) 3-15 may connect to an external network through the NR gNB 3-10 and the NR CN 3-05.

In FIG. 3, the NR gNB 3-10 may correspond to an evolved node B (eNB) of the existing LTE system. The NR gNB may be connected to the NR UE 3-15 through a radio channel, and it can provide a more superior service than that of the existing node B. All user traffic may be serviced through shared channels in the next-generation mobile communication system. Hence, there is a need for an entity that performs scheduling by collecting status information, such as buffer states, available transmission power states, and channel states of individual UEs, and the NR NB 3-10 may take charge of this. One NR gNB may control a plurality of cells. To implement ultra-high-speed data transmission compared with current LTE, a bandwidth beyond the existing maximum bandwidth may be utilized in the next-generation mobile communication system. Also, a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE may be applied. The NR CN 3-05 may perform functions such as mobility support, bearer configuration, and quality of service (QOS) configuration. The NR CN is an entity taking charge of not only mobility management but also various control functions for the UE, and may be connected to a plurality of base stations. In addition, the next-generation mobile communication system may interwork with the existing LTE system, and the NR CN may be connected to the MME 3-25 through a network interface. The MME may be connected to an eNB 3-30 being an existing base station.

Figure 4:
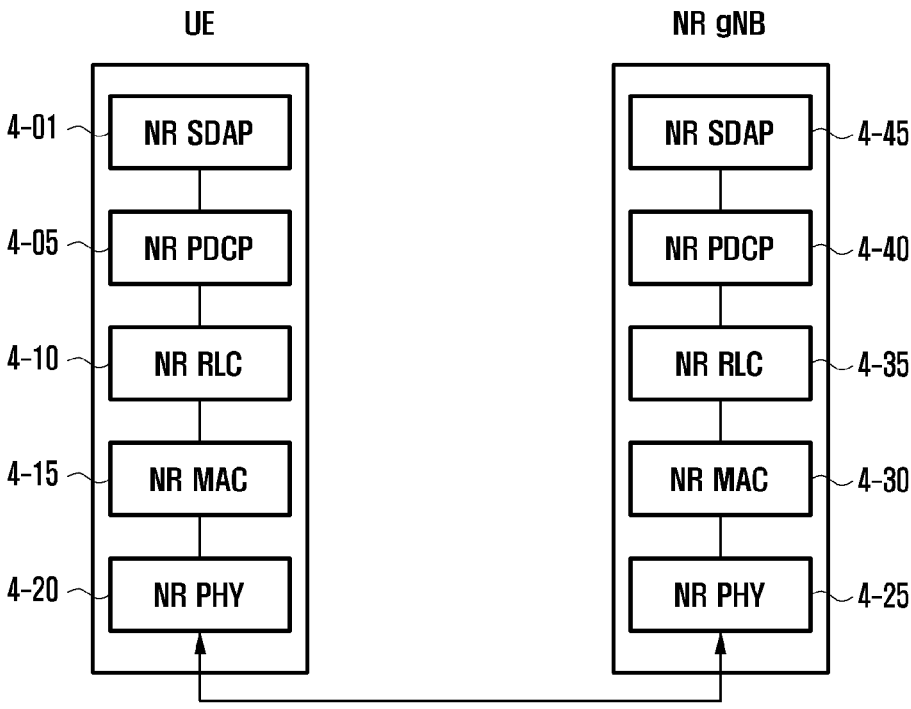
FIG. 4 is a diagram illustrating a structure of radio protocols in a next-generation mobile communication system according to an embodiment of the disclosure.

FIG. 4 is a diagram illustrating the structure of radio protocols in a next-generation mobile communication system according to an embodiment of the disclosure.

With reference to FIG. 4, in a UE or an NR gNB, the radio protocols of the next-generation mobile communication system are composed of NR service data adaptation protocol (SDAP) 4-01 or 4-45, NR PDCP 4-05 or 4-40, NR RLC 4-10 or 4-35, NR MAC 4-15 or 4-30, and NR PHY 4-20 or 4-25.

The main functions of the NR SDAP 4-01 or 4-45 may include some of the following functions.

User data transfer function (transfer of user plane data)
    Mapping function between QoS flows and data bearers for uplink and downlink (mapping between a QoS flow and a DRB for both DL and UL)
    QOS flow ID marking function for uplink and downlink (marking QoS flow ID in both DL packets and UL packets)
    Function of mapping reflective QoS flow to data bearer for uplink SDAP PDUs (reflective QoS flow to DRB mapping for the UL SDAP PDUs)

With respect to the SDAP entity, the UE may be configured with, through a radio resource control (RRC) message, whether to use a header of the SDAP entity or whether to use a function of the SDAP entity for each PDCP entity, bearer, or logical channel. If a SDAP header is configured, the SDAP entity may use a NAS (non-access stratum) reflective QoS 1-bit indication and AS (access stratum) reflective QoS 1-bit indication of the SDAP header to instruct the UE to update or reconfigure the mapping information between QoS flows and data bearers for the uplink and downlink. The SDAP header may include QoS flow ID information indicating the QoS. The QoS information may be used as data processing priority and scheduling information for supporting smooth services.

The main function of the NR PDCP 4-05 or 4-40 may include some of the following functions.

Header compression and decompression function (header compression and decompression: ROHC only)
    User data transfer function (transfer of user data)
    In-sequence delivery function (in-sequence delivery of upper layer PDUs)
    Out-of-sequence delivery function (out-of-sequence delivery of upper layer PDUs)
    Reordering function (PDCP PDU reordering for reception)
    Duplicate detection function (duplicate detection of lower layer SDUs)
    Retransmission function (retransmission of PDCP SDUs)
    Cipher and decipher function (ciphering and deciphering)
    Timer-based SDU discard function (timer-based SDU discard in uplink)

In the above description, the reordering function of the NR PDCP entity may mean reordering of PDCP PDUs received from a lower layer in order based on the PDCP sequence number (SN). The reordering function of the NR PDCP entity may include delivering data to an upper layer in reordered sequence, directly delivering data without considering the order, recording lost PDCP PDUs through reordering, reporting the status of lost PDCP PDUs to the transmitting side, or requesting retransmission of the lost PDCP PDUs.

The main function of the NR RLC 4-10 or 4-35 may include some of the following functions.

Data transfer function (transfer of upper layer PDUs)
    In-sequence delivery function (in-sequence delivery of upper layer PDUs)
    Out-of-sequence delivery function (out-of-sequence delivery of upper layer PDUs)
    ARQ function (error correction through ARQ)
    Concatenation, segmentation and reassembly function (concatenation, segmentation and reassembly of RLC SDUs)
    Re-segmentation function (re-segmentation of RLC data PDUs)
    Reordering function (reordering of RLC data PDUs)
    Duplicate detection function (duplicate detection)
    Error detection function (protocol error detection)
    RLC SDU discard function (RLC SDU discard)
    RLC re-establishment function (RLC re-establishment)

In the above description, in-sequence delivery of the NR RLC entity may mean in-sequence delivery of RLC SDUs received from a lower layer to an upper layer. In-sequence delivery of the NR RLC entity may include reassembly and delivery of RLC SDUs when several RLC SDUs belonging to one original RLC SDU are received after segmentation.

In-sequence delivery of the NR RLC entity may include reordering of received RLC PDUs based on the RLC sequence number (SN) or the PDCP SN, recording lost RLC PDUs through reordering, reporting the status of the lost RLC PDUs to the transmitting side, and requesting retransmission of the lost RLC PDUs.

If there is a lost RLC SDU, in-sequence delivery of the NR RLC entity may include in-sequence delivery of only RLC SDUs before the lost RLC SDU to an upper layer.

Although there is a lost RLC SDU, if a specified timer has expired, in-sequence delivery of the NR RLC entity may include in-sequence delivery of all the RLC SDUs received before the starting of the timer to an upper layer.

Although there is a lost RLC SDU, if a specified timer has expired, in-sequence delivery of the NR RLC entity may include in-sequence delivery of all the RLC SDUs received up to now to an upper layer.

The NR RLC entity may process RLC PDUs in the order of reception regardless of the order of the sequence number, and transfer them to the NR PDCP entity in an out-of-sequence delivery manner.

In case of receiving a segment, the NR RLC entity may reconstruct one whole RLC PDU from segments stored in the buffer or received later, and transfer it to the NR PDCP entity.

The NR RLC layer may not include a concatenation function, which may be performed by the NR MAC layer or may be replaced with a multiplexing function of the NR MAC layer.

In the above description, out-of-sequence delivery of the NR RLC entity may mean a function of transferring RLC SDUs received from a lower layer directly to a higher layer regardless of their order. If several RLC SDUs belonging to one original RLC SDU are received after segmentation, out-of-sequence delivery of the NR RLC entity may include reassembly and delivery of the RLC SDUs. Out-of-sequence delivery of the NR RLC entity may include storing the RLC SNs or PDCP SNs of received RLC PDUs and ordering them to record lost RLC PDUs.

The NR MAC 4-15 or 4-30 may be connected to several NR RLC entities configured in one UE, and the main function of the NR MAC may include some of the following functions.

Mapping function (mapping between logical channels and transport channels)

Multiplexing and demultiplexing function (multiplexing/demultiplexing of MAC SDUS)

Scheduling information reporting function (scheduling information reporting)

HARQ function (error correction through HARQ)

Priority handling function between logical channels (priority handling between logical channels of one UE)

Priority handling function between UEs (priority handling between UEs by means of dynamic scheduling)

MBMS service identification function (MBMS service identification)

Transport format selection function (transport format selection)

Padding function (padding)

The NR PHY 4-20 or 4-25 may compose OFDM symbols from higher layer data through channel coding and modulation and transmit them through a radio channel, or may demodulate and channel-decode OFDM symbols received through a radio channel and forward the result to a higher layer.

Figure 5:
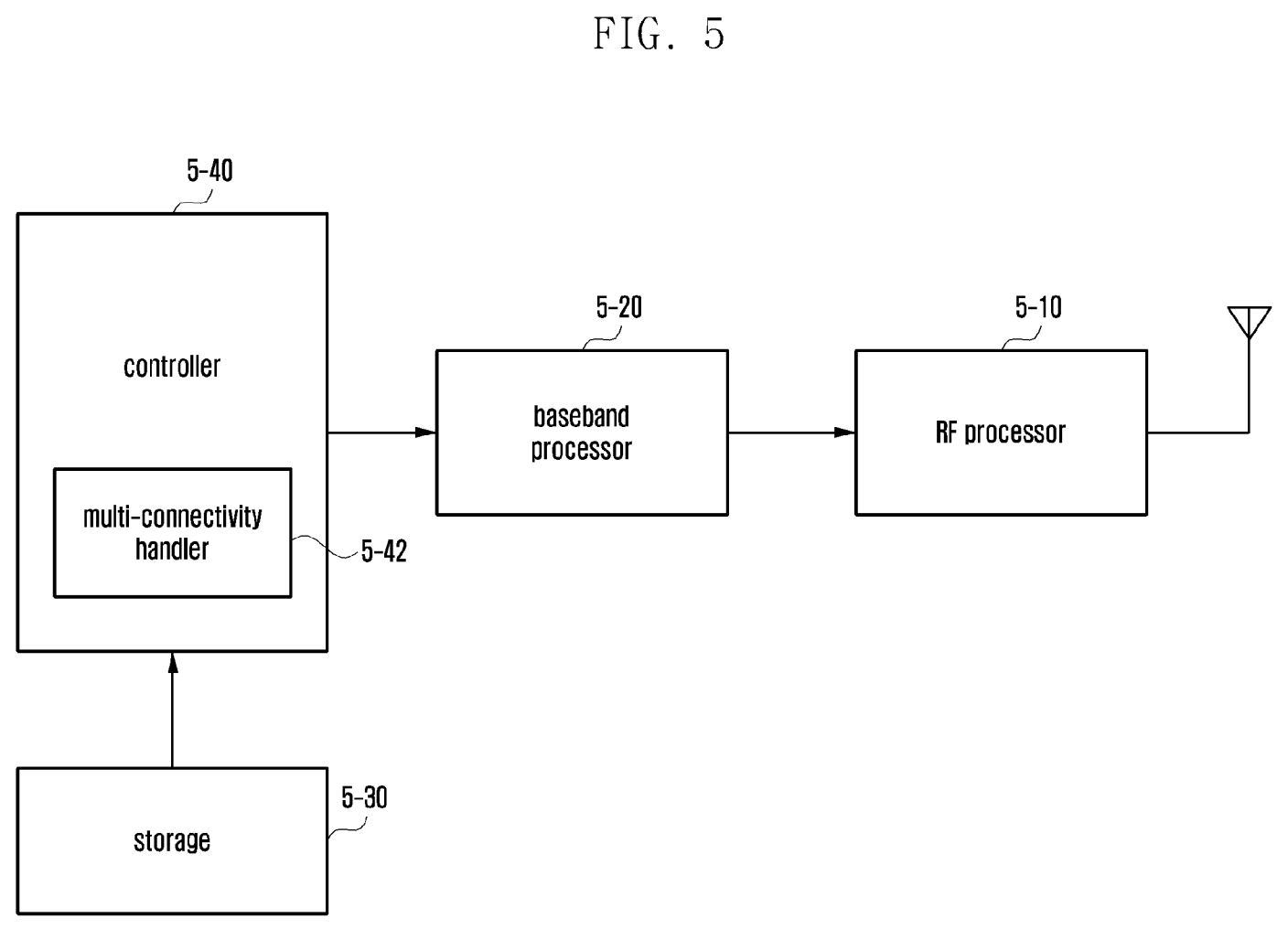

FIG. 5 is a block diagram showing the internal structure of a user equipment according to an embodiment of the disclosure.

With reference to the drawing, the UE includes a radio frequency (RF) processor 5-10, a baseband processor 5-20, a storage 5-30, and a controller 5-40.

The RF processor 5-10 performs a function for transmitting and receiving a signal through a radio channel, such as signal band conversion and amplification. That is, the RF processor 5-10 performs up-conversion of a baseband signal provided from the baseband processor 5-20 into an RF-band signal and transmits it through an antenna, and performs down-conversion of an RF-band signal received through an antenna into a baseband signal. For example, the RF processor 5-10 may include a transmission filter, a reception filter, an amplifier, a mixer, an oscillator, a digital-to-analog converter (DAC), and an analog-to-digital converter (ADC). Although only one antenna is illustrated in FIG. 5, the UE may be provided with a plurality of antennas. Also, the RF processor 5-10 may include a plurality of RF chains. Further, the RF processor 5-10 may perform beamforming. For beamforming, the RF processor 5-10 may adjust phases and magnitudes of individual signals transmitted and received through the plural antennas or antenna elements. Further, the RF processor may perform MIMO, and may receive several layers during an MIMO operation.

The baseband processor 5-20 performs conversion between a baseband signal and a bit stream in accordance with the physical layer specification of the system. For example, during data transmission, the baseband processor 5-20 generates complex symbols by encoding and modulating a transmission bit stream. Further, during data reception, the baseband processor 5-20 restores a reception bit stream by demodulating and decoding a baseband signal provided from the RF processor 5-10. For example, in the case of utilizing orthogonal frequency division multiplexing (OFDM), for data transmission, the baseband processor 5-20 generates complex symbols by encoding and modulating a transmission bit stream, maps the complex symbols to subcarriers, and composes OFDM symbols through inverse fast Fourier transform (IFFT) operation and cyclic prefix (CP) insertion. Further, for data reception, the baseband processor 5-20 divides a baseband signal provided from the RF processor 5-10 in units of OFDM symbols, restores the signals mapped to subcarriers through fast Fourier transform (FFT) operation, and restores the reception bit stream through demodulation and decoding.

The baseband processor 5-20 and the RF processor 5-10 transmit and receive signals as described above. Hence, the baseband processor 5-20 and the RF processor 5-10 may be called a transmitter, a receiver, a transceiver, or a communication unit. Further, to support different radio access technologies, at least one of the baseband processor 5-20 or the RF processor 5-10 may include a plurality of communication modules. In addition, to process signals of different frequency bands, at least one of the baseband processor 5-20 or the RF processor 5-10 may include different communication modules. For example, the different radio access technologies may include a wireless LAN (e.g., IEEE 802.11), a cellular network (e.g., LTE), and the like. In addition, the different frequency bands may include a super high frequency (SHF) band (e.g., 2.NRHz, NRhz) and a millimeter wave (mmWave) band (e.g., 60 GHz).

The storage 5-30 stores data such as basic programs, application programs, and configuration information for the operation of the UE. In particular, the storage 5-30 may store information about a second access node that performs wireless communication using a second radio access technology. The storage 5-30 provides stored data in response to a request from the controller 5-40.

The controller 5-40 controls the overall operation of the UE. For example, the controller 5-40 transmits and receives signals through the baseband processor 5-20 and the RF processor 5-10. Further, the controller 5-40 writes or reads data to or from the storage 5-40. To this end, the controller 5-40 may include at least one processor. For example, the controller 5-40 may include a communication processor (CP) for controlling communication and an application processor (AP) for controlling higher layers such as application programs.

Figure 6:
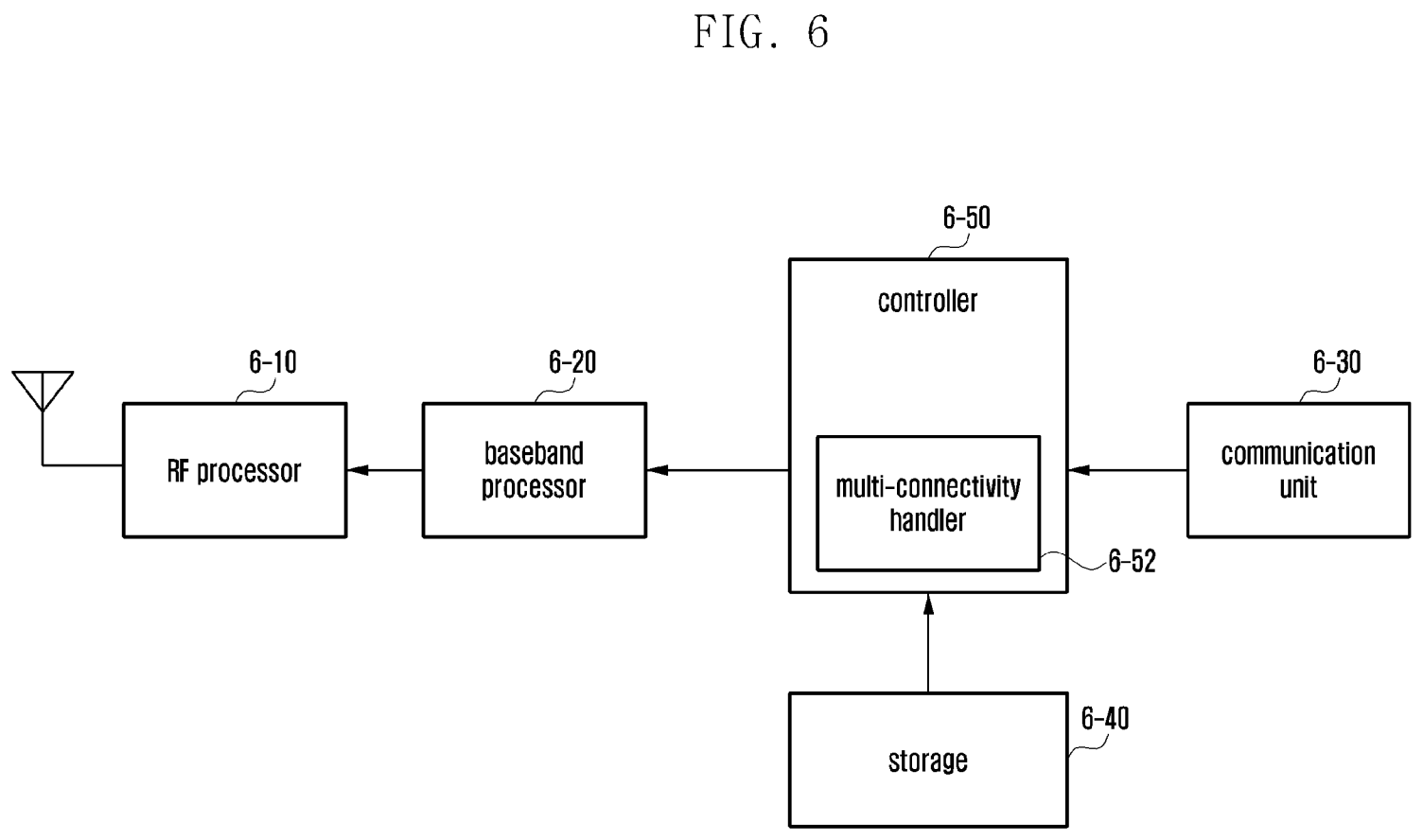

FIG. 6 is a block diagram showing the configuration of a base station according to an embodiment of the disclosure.

As shown in FIG. 6, the base station includes an RF processor 6-10, a baseband processor 6-20, a communication unit 6-30, a storage 6-40, and a controller 6-50.

The RF processor 6-10 performs a function for transmitting and receiving a signal through a radio channel, such as signal band conversion and amplification. That is, the RF processor 6-10 performs up-conversion of a baseband signal provided from the baseband processor 6-20 into an RF-band signal and transmits the converted signal through an antenna, and performs down-conversion of an RF-band signal received through an antenna into a baseband signal. For example, the RF processor 6-10 may include a transmission filter, a reception filter, an amplifier, a mixer, an oscillator, a DAC, and an ADC. Although only one antenna is illustrated in FIG. 6, the first access node may be provided with a plurality of antennas. Additionally, the RF processor 6-10 may include a plurality of RF chains. Further, the RF processor 6-10 may perform beamforming. For beamforming, the RF processor 6-10 may adjust phases and amplitudes of individual signals transmitted and received through plural antennas or antenna elements. The RF processor may perform downlink MIMO operation by transmitting one or more layers.

The baseband processor 6-20 performs conversion between a baseband signal and a bit stream in accordance with the physical layer specification of a first radio access technology. For example, for data transmission, the baseband processor 6-20 generates complex symbols by encoding and modulating a transmission bit stream. Further, for data reception, the baseband processor 6-20 restores a reception bit stream by demodulating and decoding a baseband signal provided from the RF processor 6-10. For example, in the case of utilizing OFDM, for data transmission, the baseband processor 6-20 generates complex symbols by encoding and modulating a transmission bit stream, maps the complex symbols to subcarriers, and composes OFDM symbols through IFFT operation and CP insertion. Further, for data reception, the baseband processor 6-20 divides a baseband signal provided from the RF processor 6-10 in units of OFDM symbols, restores the signals mapped to subcarriers through FFT operation, and restores the reception bit stream through demodulation and decoding. The baseband processor 6-20 and the RF processor 6-10 transmit and receive signals as described above. Hence, the baseband processor 6-20 and the RF processor 6-10 may be called a transmitter, a receiver, a transceiver, a communication unit, or a wireless communication unit.

The backhaul communication unit 6-30 provides an interface for communication with other nodes in the network. That is, the backhaul communication unit 6-30 converts a bit stream, which is to be transmitted from the primary base station to another node, for example, a secondary base station or the core network, into a physical signal, and converts a physical signal received from another node into a bit stream.

The storage 6-40 stores data such as basic programs, application programs, and configuration information for the operation of the primary base station. In particular, the storage 6-40 may store information on a bearer allocated to a connected UE and measurement results reported from the connected UE. Further, the storage 6-40 may store information used as a criterion for determining whether to provide or suspend multi-connectivity to the UE. In addition, the storage 6-40 provides stored data in response to a request from the controller 6-50.

The controller 6-50 controls the overall operation of the primary base station. For example, the controller 6-50 transmits and receives signals through the baseband processor 6-20 and the RF processor 6-10 or through the backhaul communication unit 6-30. Further, the controller 6-50 writes or reads data to or from the storage 6-40. To this end, the controller 6-50 may include at least one processor.

FIG. 7A to 7F are diagrams illustrating operations of an IAB node according to an embodiment of the disclosure. In the disclosure, it is assumed that "in the proposed handover scheme, the IAB MT has a common backhaul adaptation protocol (BAP) entity for the source parent node and the target parent node".

In the above handover scheme, the IAB MT may perform the following basic operations.

When handover is executed, the IAB MT may receive DL user data through a backhaul (BH) link via the source parent IAB node and continue receiving DL user data until the source parent node is released. The IAB MT may transmit uplink user data to the source parent node through a BH link until random access to a cell of the target parent node succeeds.

During handover, the IAB MT may operate only on the Pcell.

When the IAB MT receives a handover command, if handover is initiated by RRC, the IAB MT shall perform the following operations.

Creates a MAC entity for target;

Establishes the RLC entity and an associated DTCH logical channel for target for each BH RLC CH configured with this HO;

Reconfigures BAP function for target and associates that with the RLC entities configured for target; i.e., UL packets are configured to be transferred via default UL configuration (upon RA success or UL switch)

Retains the rest of the source configurations until release of the source.

When this handover fails, the UE falls back to the source cell configuration (including BAP/BH mapping configuration, default UL configuration), resumes the connection with the source cell, and reports this handover failure via the source without triggering RRC connection re-establishment if the source link has not been released and if the RLF is not detected for the source link.

Source CU will include the indication to trigger this HO type to target CU in HO preparation msg or HO Request msg in XnAP.

Target CU will include the default UL configuration (for using UL switching case) to the target path in HO CMD.

BH routing information at target path could be either in HO CMD or in regular F1AP signaling after HO completion. The BH routing information being information included in existing F1AP BAP mapping configuration messages may include the following information.

BH routing information added list: pair of BAP routing Id and next hop BAP address, and a routing table is composed of this information.

Traffic mapping information IE: may include the following two sub information.

1) IP to layer 2 traffic mapping info: IP to BAP routing ID. This information is used as header information of the BAP PDU by mapping the IP address of the upper layer to the BAP routing ID for UL BAP PDU generated by the IAB node itself.

2) BAP layer BH RLC channel mapping info IE: information for assigning BH RLC CH for UL BAP PDU generated by the IAB node itself.

In addition, through F1AP, the following information may be received.

Uplink traffic to routing ID mapping configuration.

Downlink traffic to routing ID mapping configuration.

BH routing configuration.

BH RLC channel mapping configuration.

Uplink traffic to BH RLC channel mapping configuration.

Downlink traffic to BH RLC channel mapping configuration.

In the disclosure, it is assumed that the BAP mapping configuration through F1AP or included in a handover (HO) command in another embodiment includes all of the above information.

The following illustrates operations of the IAB MT in terms of receiving an RRC message and a specific message.

Followings are operations regarding RRC procedure and F1AP procedures:

1. This HO can be configured per BH RLC CH which means each BH RLC CH at source path can be either configured with type indicator or not (i.e., normal HO).

A. RRCReconfiguration in HO CMD can have the indication of this HO per existing BH RLC CH at the source path.

B. On reception of this RRCReconfiguration msg, migrating IAB node can:

i. For each BH RLC CH indicated of this HO type, i-1. BAP configuration at migrating IAB node should keep the following configuration as received from source path donor CU.

a. BAP address of this migrating node.

b. BAP routing configuration at this migrating node.

c. Bearer mapping configuration at this migrating node.

i-2. Keep BH RLC CH at the source link for this indicated BH RLC CH.

i-3. Keep the normal DL UL routing operation (routing, BH RLC CH mapping, and transmitting) as normal behavior.

ii. For each BH RLC CH not indicated of this HO, ii-1. Remove BH RLC CH at the source path link.

ii-2. Release RLC entity for this BH RLC CH.

ii-3. Release logical channel for this BH RLC CH.

iii. Possible alternative: this HO is not per BH RLC CH, and single indication in RRCReconfig can keep all the established BH RLC CHs and related BAP configuration.

iv. Migrating IAB node tries legacy HO procedure like:

iv-1. Random access to the target parent node, and if that is successful, it sends RRCReconfigComplete, and receive F1AP BH routing configuration or BAP mapping configuration from target CU.

C. On successful RA to the target parent node (the following operation is an autonomous operation of the IAB MT. In other words, it operates by itself when RA succeeds. To this end, when RA is successful, the MAC/RRC may deliver an indication that RA is successful to the BAP. The following operations can be seen as operations performed as a result of receiving the indicator at the BAP.)

i. UL switch is considered:

i-1. Default UL configuration (which was included in HO CMD) is used for the UL packet (F1U and or non-F1U traffic) via the target parent (all the UL packets via this configuration).

i-2. Remove source BAP related configurations for UL in BAP configuration.

i-3. Alternative: can keep this for fall back case, but not used for HO.

D. After reception on F1AP BH routing configuration/ BAP mapping configuration from the target CU, i. DL reception from both source target parent nodes starts.

ii. Packet flagging (target CU assigns the routing ID for BAP PDU which should be routed to migrating IAB node and its descendant nodes).

ii-1. BAP PDU header has 1 bit space to indicate source target routing space.

ii-2. There are 3 reserve bits, one of them can be used.

ii-3. Other IAB nodes than migrating IAB node ignore this bit.

E. On reception of release command from the target parent node (D needs to be followed by E due to interruption)

i. Release source path BH RLC CH and its configuration, release all the remaining RLC entities, MAC, physical configurations.

ii. Remove BAP configurations associated with source routing configurations.

ii-1. BAP address assigned by source CU.

Figure 7A:
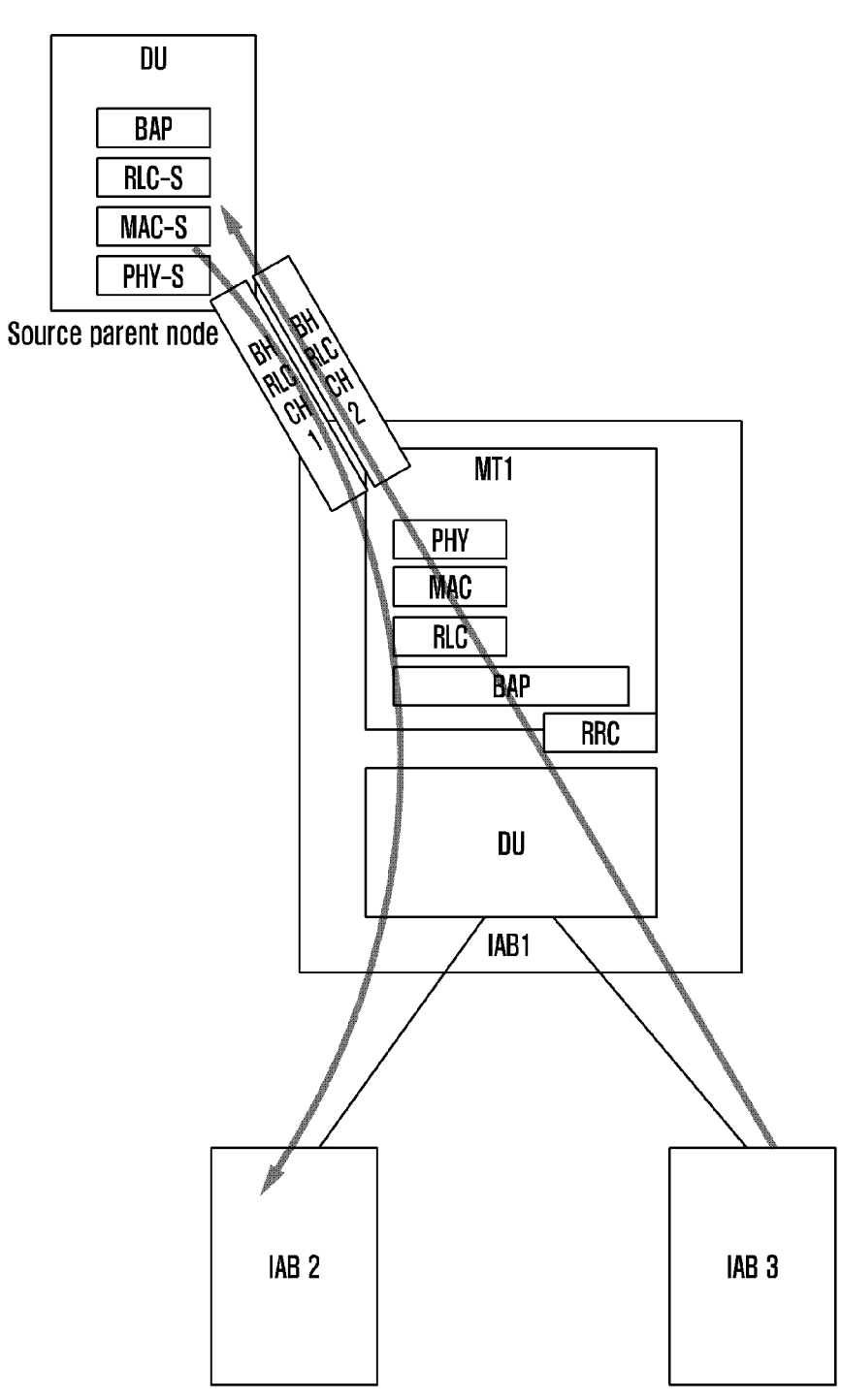
FIG. 7A is a diagram illustrating operations of an IAB node according to an embodiment of the disclosure.

In FIG. 7A, the IAB node is performing a normal operation with the source parent node. The IAB node may receive DL user data from the source parent node through BH RLC channel 1/2 and route it to IAB node 2/3 in the DL direction, and it may receive UL direction BAP PDUs from IAB node 2/3 and transmit them to the source parent node through routing.

Figure 7B:
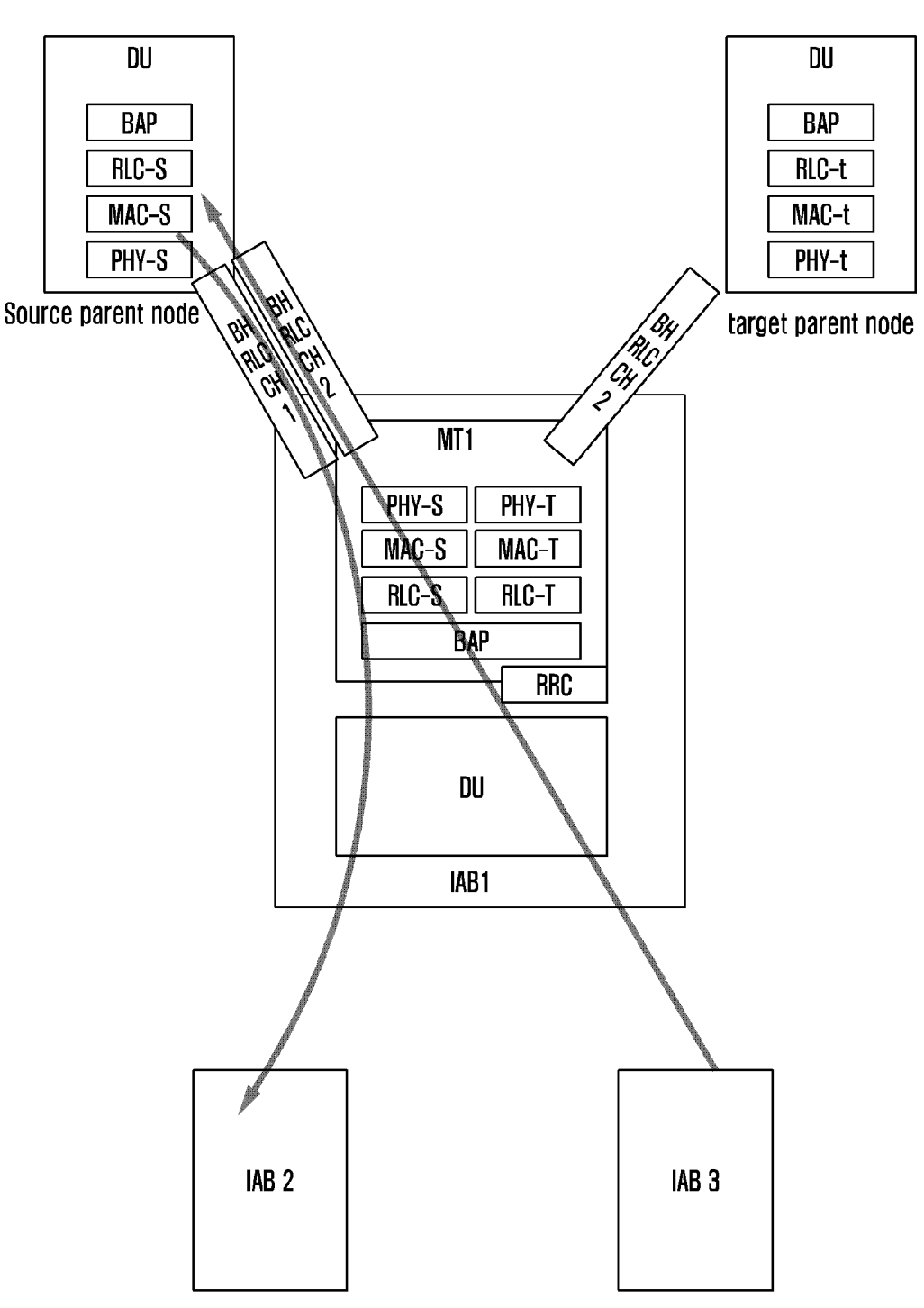
FIG. 7B is a diagram illustrating operations of an IAB node according to an embodiment of the disclosure.

In FIG. 7B, IAB node 1 may receive a handover command (RRCReconfiguration message including Reconfiguration-WithSync) from the source donor node (or source donor DU). This message may include the following information.

RRC config for default UL config via target path for non-F1U and/or F1U traffic, where it is configuration information determined by the target donor node.

New BAP routing config to remove un-indicated BH RLC CH, where this information may be created by the source donor node and delivered later through F1AP separately from the RRC HO command.

RRC config for target MAC, RLC, BH RLC CH setup.

With the above information, at least one of the following may be performed:

Keep source configurations (RLC configuration, MAC configuration) per BH RLC CH, and routing configurations from source donor node, BAP address on migrating nodes and its descendent nodes.

remove BH RLC CH not indicated as this type handover in HO CMD, and remove its configurations in BAP routing config.

setup MAC for target, setup RLC entity and associate BH RLC CH indicated this HO at target cell (parent IAB node).

RA.

In this situation, the source link is valid, and DL/UL user data traffic is received/transmitted through the source link being maintained. Such data may be DL transmitted to the child node or UL transmitted to the source parent node by using the routing configuration provided by the source. Currently, on the target side, the BH RLC CH is established and RLC/MAC/PHY layers are established, but UL/DL traffic is not actually transmitted/received to/from the target parent node because RRC establishment has not been completed.

Figure 7C:
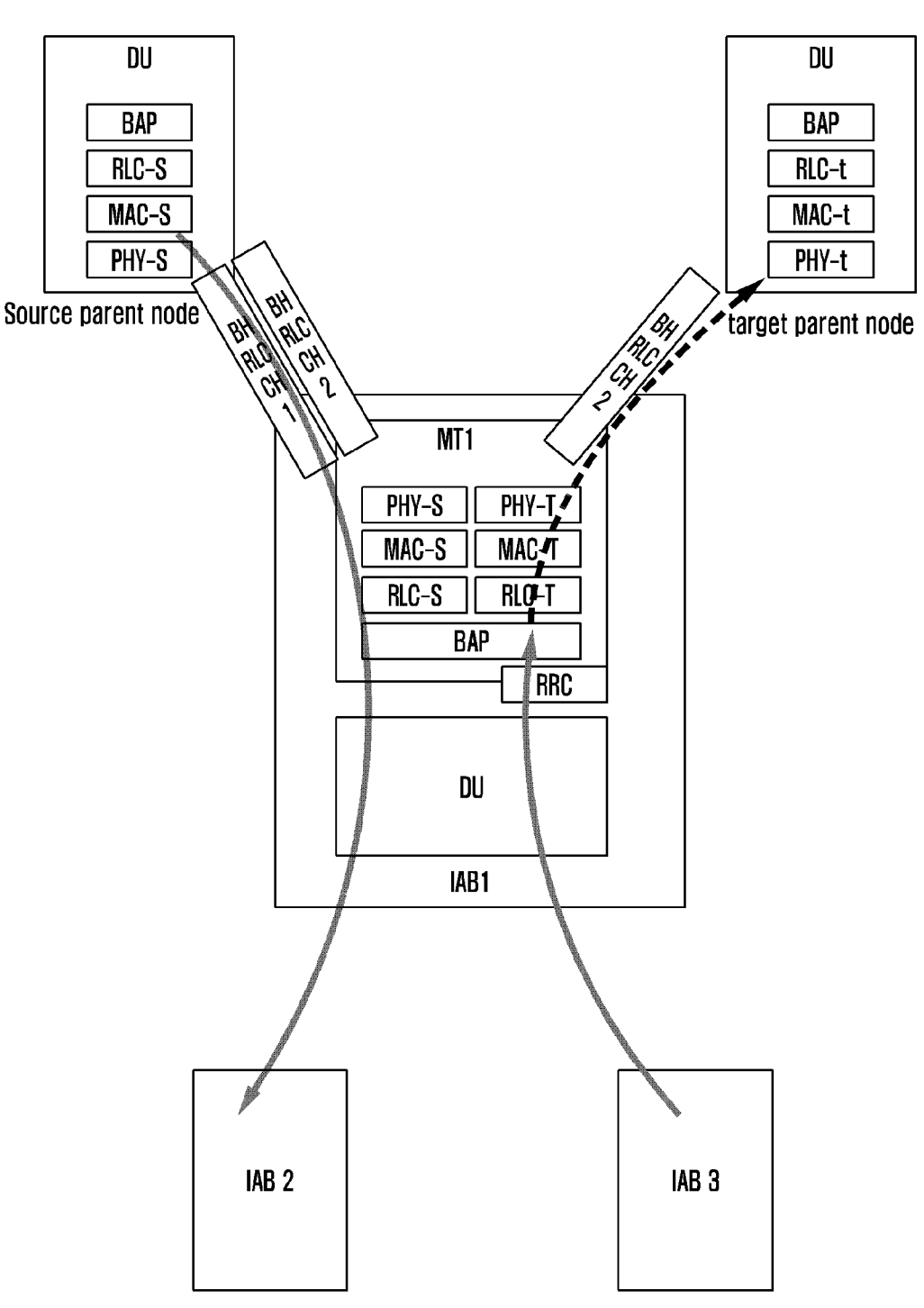
FIG. 7C is a diagram illustrating operations of an IAB node according to an embodiment of the disclosure.

In FIG. 7C, if random access to the target parent node succeeds, the following operation may be performed.

An indicator or indication that random access has succeeded may be delivered to the BAP layer. This indication triggers the use of the default UL configuration below.

For all UL BAP PDU (including received from child node, and generated at migrating IAB node) using default UL config, i.e. routing id of each BAP PDU is replaced with default UL routing id, and default UL BH RLC CH is assigned to each rewritten UL BAP PDU, and then transferred via target link to the target parent node.

Send RRCReconfigComplete to the target parent node.

For intra-donor case, there is no BAP address change for migrating node and descendant nodes.

For inter-CU case, the migrating node can be newly assigned a BAP address from the target CU. (received in HO CMD, or RRCReconfig after HO completes)

Default UL configuration information may include the following information.

defaultUL-BAP-RoutingID-F1U: as a routing ID considering the target path, it may be path ID from the BAP address of the target donor DU to the corresponding destination. It may be used for non-F1-U or/and F1-U traffic.

defaultUL-BH-RLC-channel-F1U: as a BH RLC channel considering the target path, it may be a BH RLC channel configured in a link on the default-BAP-routing ID-F1U. It may be used for non-F1-U or/and F1-U traffic.

Available timer: time for which the default UL configuration information is applied and maintained.

Using the default UL with this information means that the routing ID in the header of each BAP PDU is rewritten with the routing ID of the default UL. It also means that the default BH RLC channel is allocated as the BH RLC channel for transmission to this rewritten BAP PDU.

In FIG. 7D, when the migrating IAB node receives a F1AP BH mapping configuration message from the target donor, it may perform the following operations.

Configure BAP with received BAP mapping configurations. (add DL routing id via target path to routing entry, replace UL routing id via source path in routing entry with UL routing id via target path) (With the routing configuration received from the target, the next hop of the routing IDs corresponding to the existing BAP address must be changed to the target path. This configuration is possible by deleting the existing UL path configuration and adding new target configuration.)

Receiving DL BAP PDU coming from the target path.

Transmit UL BAP PDU via only target path. (UL BAP PDUs that do not match the routing entry are transmitted as usual using the default UL, and UL BAP PDUs that match the routing entry or originate from the migrating IAB node are routed using the current routing configuration given by the target donor node.)

DL via source and target path can be routed to descendent nodes (for DL, an entry for the routing id coming from the target path is added to the routing table. The routing id entry for the existing source path is left as is.)

In FIG. 7E, instead of the case of FIG. 7D, for inter donor migration, when the migrating IAB node receives a F1AP BAP mapping configuration, it may perform the following operations.

Migrating IAB node receives DL BAP PDU coming from the target path and source together.

UL via only target path (if there is a packet not matching current UL routing entry, use default UL. Otherwise normal UL routing)

DL via source and target path can be routed to descendent nodes by separating source set of routing config and target set of routing config. For inter-CU case, the migrating node may be newly assigned a BAP address from the target CU (received in HO CMD, or received through RRCReconfig after HO completes). However, it can be applied only after receiving F1-AP BAP mapping config message.

During this period, two BAP addresses received from the source donor and from the target donor may coexist. The source donor CU may distinguish PDCP SDUs resulting from data forwarding of PDCP SDUs for the corresponding migrating IAB node during this handover, and may include a 1-bit indication in the BAP data PDU header of PDCP PDUs on the source side after starting of data forwarding. If there is an indication in the packet received as DL BAP PDU received during HO, the migrating IAB node may consider the BAP address received from the source as its own address and perform DL routing by using the routing configuration of the source.

If there is no indication, the migrating IAB node may consider the BAP address received from the target as its own BAP address. In addition, it applies the routing configuration set received from the target when routing towards the descendants.

Figure 8:
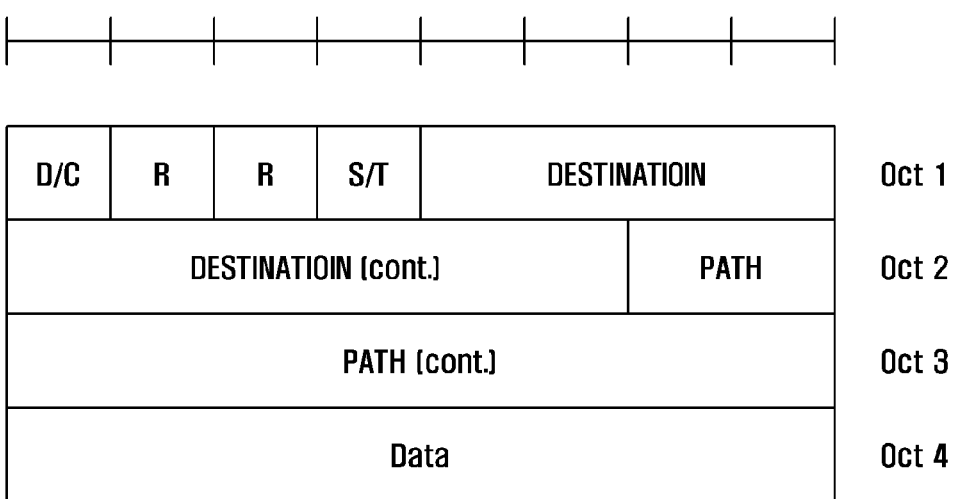
FIG. 8 is a diagram illustrating the header of a BAP data PDU.

In the case of UL, if the routing id of a packet received from a descendent node does not exist in the entries given by the target, the packet is rewritten with the default UL and is transmitted. In the above embodiment, the meaning of including a 1-bit indication may indicate that a preset value (0 or 1) indicating the source is given in the 1-bit indication that distinguishes between the source and the target as shown in FIG. 8 to be described later. In the above embodiment, the meaning of no indication may indicate that a preset value indicating the source is not given in the 1-bit indication that distinguishes between the source and the target as shown in FIG. 8 to be described later. Accordingly, in the above embodiment, the migrating node and its descendant node may check the header of DL BAP PDUs received during HO of the migrating node, distinguish between BAP PDUs having a 1-bit source/target indication set to a value indicating the source and BAP PDUs not having such an indication, and apply source routing and target routing respectively. Nodes other than the migrating node and its descendant node do not consider the 1-bit source/target indication.

The above scheme may be referred to as packet flagging.

As another scheme of packet flagging, when the migrating IAB node receives DL BAP PDUs from the source or target parent node, it distinguishes between DL BAP PDUs coming through each source ingress link and DL BAP PDUs coming through each target ingress link; for a BAP PDU received from the source, the migrating IAB node compares the BAP address set by the source with that of the packet, and if the same, the packet has the migrating IAB node as destination, and it distributes the BAP address set by the source to its accessing UE. Or, for a BAP PDU received from the target, the migrating IAB node compares the BAP address set by the target with the destination address of the packet, and if the same, it distributes the BAP address set by the target to its accessing UE. If a BAP PDU does not match the BAP address set by either the source or the target, the corresponding BAP PDU should be routed towards the child node. Here, to distinguish whether a BAP PDU is received from the source or from the target, if it is a BAP data PDU received from the source, the 1-bit indicator in the header may be set to 1, and if it is a BAP data PDU received from the target, the 1-bit indicator in the header may be set to 1. (This may vary depending on the definition.) In addition, if a BAP PDU is received from the source, it is routed by using the source routing configuration of the migrating IAB node and is transmitted to the child node. If a BAP PDU is received from the target, it is routed by using the target routing configuration and is transmitted to the child node. Upon receiving a BAP PDU, the child IAB node checks the 1-bit source/target indication in the BAP PDU header, and if the indication indicates a BAP DL PDU being received from the source, the BAP PDU matching the BAP address received from the source among the BAP addresses of the receiving child IAB node should be delivered to its access UE. If the indication indicates a BAP DL PDU being received from the target, the BAP PDU matching the BAP address received from the target among the BAP addresses of the receiving child IAB node should be delivered to its access UE. If a BAP PDU does not match any BAP address, it should be routed back to the child node. Here, the source/target indication in the BAP header is not modified.

Figure 7F:
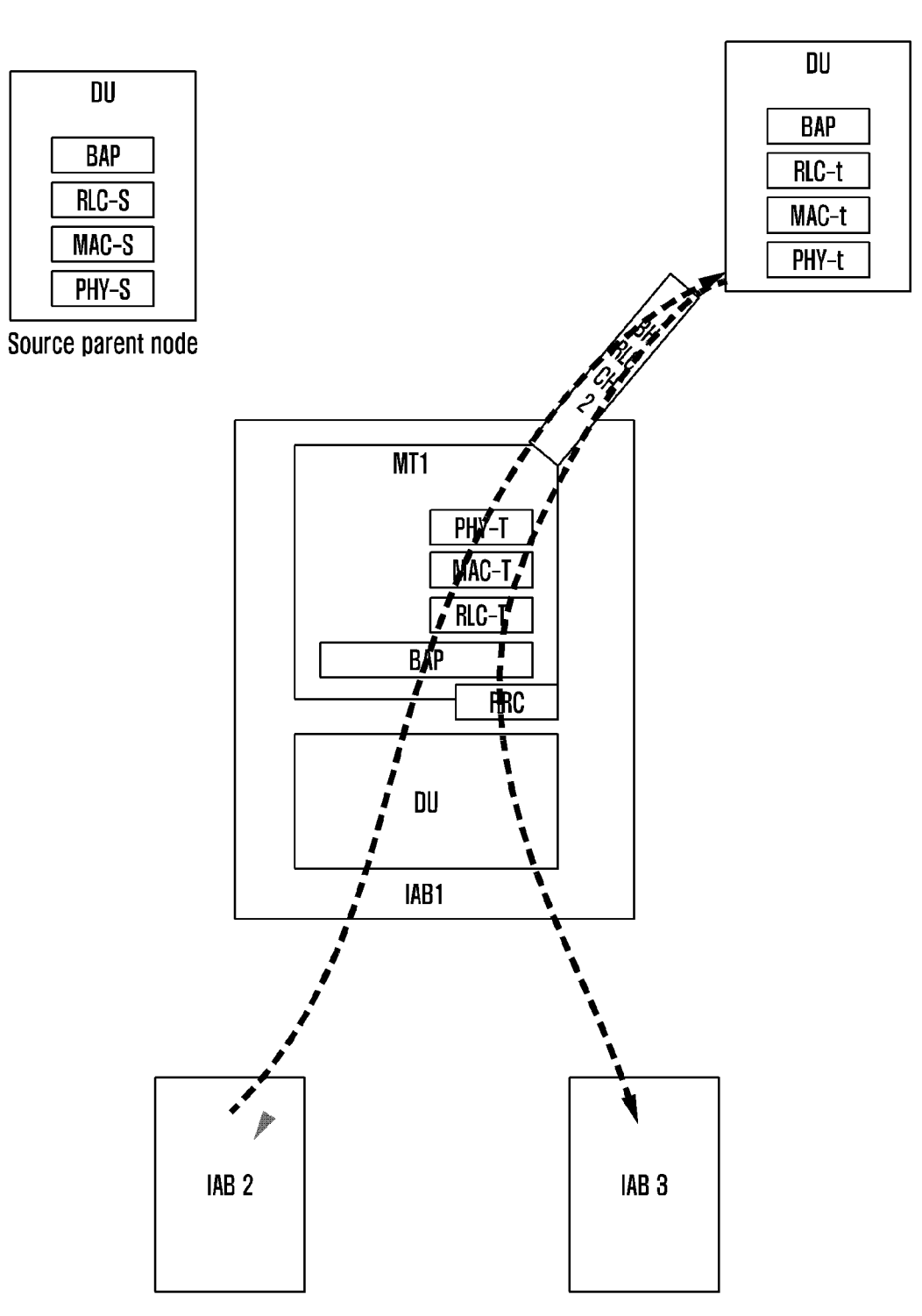
FIG. 7F is a diagram illustrating operations of an IAB node according to an embodiment of the disclosure.

In FIG. 7F, the migrating IAB node receives a source cell release indication via an RRCReconfiguration message. In this case, the IAB node may perform the following operations.

Remove source link.

Remove source path BH RLC CH, and its configurations.

Remove the radio resource on source path.

Remove routing entry on DL routing id via source path. (This information may be signaled separately from the source donor through F1AP.)

If the IAB node performs an operation to set a 1-bit indicator in the header during packet flagging, it stops the operation.

FIG. 8 is a diagram illustrating the header of a BAP data PDU.

In FIG. 8, the S/T field is a 1-bit indicator, and 0 may indicate the source and 1 may indicate the target, or 0 may indicate the target and 1 may indicate the source. According to the packet flagging scheme, the S/T field may be an indication that is written by the source/target donor node and is included in a DL BAP PDU received from the source/target parent node, or it may be an indication that is written directly by the migrating IAB node and is used by descendent IAB nodes to distinguish between a DL packet from the source and a DL packet from the target for packet routing.

<Operational Idea for Initial Access of Multi-MT IAB Node>

If multiple MTs are associated with one IAB node, they may connect to the same cell if the MTs perform initial access separately. In this case, to separate links for multi-connectivity, the network will have to hand over a specific MT among different MTs connected to the same cell to another cell. To this end, the network needs to know whether multiple MTs belong to a particular IAB node. The following options are possible.

[OPT 1] Priority information of a specific cell may be introduced into the cell selection parameters. A specific frequency ARFCN (absolute radio frequency channel number) and PCI (physical cell identity) information of a cell to be selected at the corresponding frequency may be preconfigured. The MT having received the above information may select and connect to a specific cell upon cell selection.

[OPT 2] As UE context information in the AN parameters transmitted to the AMF (access and mobility management Function), there is an indicator indicating whether being an IAB node or not. Additionally, an indicator indicating whether being multi-MT or not, and an ID that can identify the corresponding IAB node may be added. The above information may be included in a NAS (non-access stratum) signal and transmitted to the AMF in an initial attach process when the MT connects to a specific cell.

Later, when the AMF checks the UE context information, if multiple MTs of a specific IAB node are delivered, it may instruct the serving gNB to handover one of them to a specific cell. The corresponding command may include a UE ID in the AMF of the MT being a HO target, and a CGI (cell global identity) and PCI information of the target cell.

[OPT 3] Each MT may include an indicator in RRCsetupComplete upon initial access. The indicator may be one of the following.

1. Introducing IAB Node ID.

The corresponding ID may be included in RRCsetupComplete message instead of an iab-node indicator. If an MT with a corresponding ID succeeds in access and an MT with the same ID subsequently succeeds in access, when the MTs are connected to the same parent node, the CU may select one of the two MTs and hand over the selected one to another parent node.

In the handover operation, as in the case of an existing regular UE, a measurement configuration for a candidate target cell may be transmitted to the MT to be handed over, and the CU may select the target cell and then transmit a HO command.

When performing HO after initial access, the node to which a remaining MT is connected, that is, the node that becomes the source cell for the MT to be handed over, can act as a master node from the perspective of the IAB node. Relatively, the node of the target cell for the MT being handed over can act as a secondary node from the perspective of the IAB node.

The donor CU (or master node) recognizing the corresponding ID may allocate the same BAP address when allocating the BAP address of each MT. (in case of BAP entity per each MT in multi-MT IAB node)

Intra carrier DC-related resource coordination request information may be included in a HO request message. One or more of the following information may be included.

Master node indicator.

Indicator indicating that the current MT being handed over is one in the multi-MT IAB node. And/or;

Corresponding IAB node ID

List of information on IAB MTs associated with the IAB node together with this MT (in the case of two or more MTs)

XnAP UE/MT ID

Source node ID, TNL information

Resource coordination information requested for this MT (supported (requested) carrier band info, supportable TDD/FDD configuration, supported resource pattern etc.)

Other inter-node signaling messages may be required. For example, there may be SNAddReq/SNAddReqACK, or a new XnAP message pair.

Figure 9:
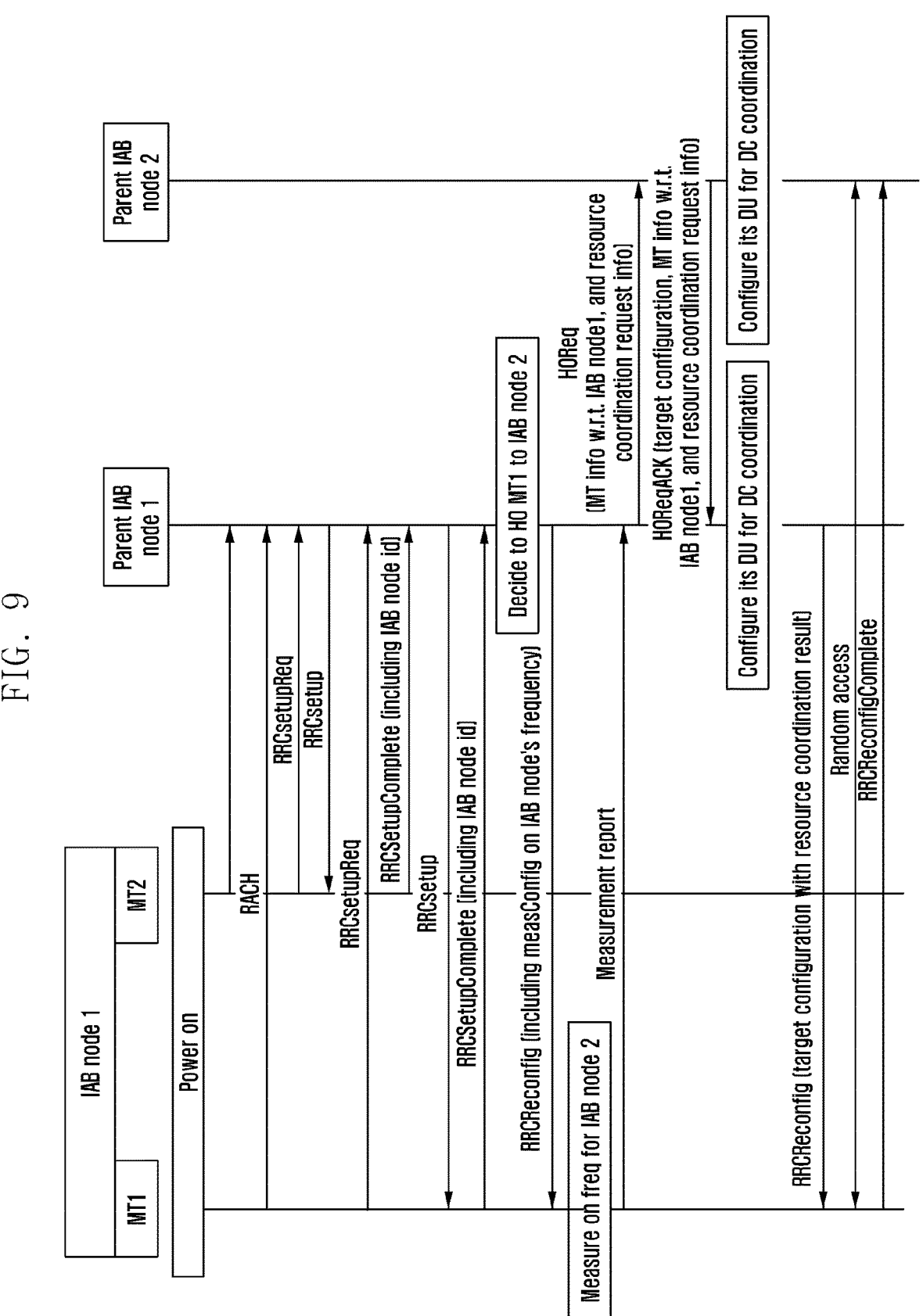
FIG. 9 is a diagram illustrating an initial network access process when multiple MTs exist in an IAB node.

FIG. 9 is a diagram illustrating an initial network access process when multiple MTs exist in an IAB node. That is, FIG. 9 illustrates an initial network access process when multiple MTs exist in IAB node 1.

Individual MTs select a cell after power on, and if they selects the same cell, they goes through an RRC setup process. Here, each MT may include its IAB node ID in an RRCSetupComplete message and transmit it.

Upon recognizing that these values are the same, the serving cell may select one MT among them, transmit measurement configuration information for handover, receive a report on the measurement result according to the configuration, and hand over the selected MT to the target cell appropriate for the result.

In the handover preparation process, a HO request message, which includes information such as common IAB node ID, the information mentioned above, and resource coordination request information, may be transmitted to the target node. If the target node checks the received information and accepts the requested information, it may transmit resource setting values to be used by MT2 in IAB node 1 being the corresponding source node and transmit resource configuration information to be used by MT1 in LAB node 2 at the same time.

Thereafter, MT 1 is handed over to node 2, and MT1 and MT2 may use coordinated resources for single IAB node operation.

The invention claimed is:

1. A method performed by an integrated access and backhaul (IAB) node in a wireless communication system, the method comprising:
   receiving, from a source IAB node, a control message for handover including default uplink configuration information, wherein the default uplink configuration information includes an uplink routing identifier, a backhaul radio link control (RLC) channel, and an available timer associated with a target IAB node;
   generating a medium access control (MAC) entity for the target IAB node based on the received control message;
   establishing a logical channel and an RLC entity for the target IAB node;
   reconfiguring a backhaul adaptation protocol (BAP) entity for the target IAB node, wherein the BAP entity is associated with the RLC entity configured for the target IAB node;
   performing a random access procedure to the target IAB node;
   receiving, from a target donor node, a message including a backhaul mapping configuration;
   adding a downlink routing identifier based on the backhaul mapping configuration; and
   replacing the uplink routing identifier and the backhaul RLC channel based on the backhaul mapping configuration.

2. The method of claim 1, wherein the source IAB node transmits a message including an indication of triggered handover type to the target IAB node.

3. The method of claim 1, further comprising in case that the random access procedure fails:

falling back to a configuration for the source IAB node; and
   resuming a connection with the source IAB node.

4. The method of claim 1, wherein the handover is configured for each backhaul RLC channel.

5. The method of claim 1, wherein a configuration for the BAP entity includes at least one of BAP address, BAP routing configuration, or bearer mapping configuration.

6. The method of claim 1, wherein in case that the random access procedure succeeds, the MAC entity delivers an indicator indicating success of random access to the BAP entity.

7. An integrated access and backhaul (IAB) node comprising:
   a transceiver capable of transmitting and receiving at least one signal; and
   a controller coupled to the transceiver,
   wherein the controller is configured to:
   receive, from a source IAB node, a control message for handover,
   generate a medium access control (MAC) entity for a target IAB node based on the received control message including default uplink configuration information, wherein the default uplink configuration information includes an uplink routing identifier, a backhaul radio link control (RLC) channel, and an available timer associated with the target IAB node,
   establish a logical channel and an RLC entity for the target IAB node,
   reconfigure a backhaul adaptation protocol (BAP) entity for the target IAB node, the BAP entity being associated with the RLC entity configured for the target IAB node, and
   perform a random access procedure to the target IAB node,
   receive, from a target donor node, a message including a backhaul mapping configuration,
   add a downlink routing identifier based on the backhaul mapping configuration, and
   replace the uplink routing identifier and the backhaul RLC channel based on the backhaul mapping configuration.

8. The IAB node of claim 7, wherein the source IAB node transmits a message including an indication of triggered handover type to the target IAB node.

9. The IAB node of claim 7, wherein in case that the random access procedure fails, the controller is further configured to fall back to a configuration for the source IAB node and resume a connection with the source IAB node.

10. The IAB node of claim 7, wherein the handover is configured for each backhaul RLC channel.

11. The IAB node of claim 7, wherein a configuration for the BAP entity includes at least one of BAP address, BAP routing configuration, or bearer mapping configuration.

12. The IAB node of claim 7, wherein in case that the random access procedure succeeds, the MAC entity delivers an indicator indicating success of random access to the BAP entity.

* * * * *